(12) United States Patent
Kisielewicz

(10) Patent No.: US 11,085,536 B2
(45) Date of Patent: Aug. 10, 2021

(54) ACTUATING MEANS FOR A PARK LOCK ARRANGEMENT, PARK LOCK ARRANGEMENT AND VEHICLE COMPRISING SUCH A PARK LOCK ARRANGEMENT

(71) Applicant: Volvo Car Corporation, Gothenburg (SE)

(72) Inventor: Rafal Kisielewicz, Olofstorp (SE)

(73) Assignee: Volvo Car Corporation, Gothenburg (SE)

( * ) Notice: Subject to any disclaimer, the term of this patent is extended or adjusted under 35 U.S.C. 154(b) by 35 days.

(21) Appl. No.: 16/409,912

(22) Filed: May 13, 2019

(65) Prior Publication Data

US 2019/0353246 A1    Nov. 21, 2019

(30) Foreign Application Priority Data

May 15, 2018   (EP) ..................... 18172506

(51) Int. Cl.
| | | |
|---|---|---|
| *F16H 63/34* | (2006.01) | |
| *B60T 1/06* | (2006.01) | |
| *B60T 1/00* | (2006.01) | |

(52) U.S. Cl.
CPC .......... *F16H 63/3416* (2013.01); *B60T 1/005* (2013.01); *F16H 63/3466* (2013.01); *F16H 63/3475* (2013.01)

(58) Field of Classification Search
CPC ............. F16H 63/3416; F16H 63/3466; F16H 63/3475; F16H 63/3425; F16H 63/3483; F16H 63/3433; B60T 1/005; B60T 1/062
See application file for complete search history.

(56) References Cited

U.S. PATENT DOCUMENTS

| | | | |
|---|---|---|---|
| 3,386,532 A | | 6/1968 | Moss |
| 3,690,416 A | * | 9/1972 | Yamada .................. B60T 1/005 188/69 |
| 4,509,624 A | | 4/1985 | Barr |
| 2006/0163024 A1 | * | 7/2006 | Yamamoto .............. B60T 1/062 192/219.4 |
| 2010/0193319 A1 | | 8/2010 | Stutzer et al. |

(Continued)

FOREIGN PATENT DOCUMENTS

| | | |
|---|---|---|
| CN | 101907169 A | 12/2010 |
| DE | 2427216 A1 | 1/1975 |

(Continued)

OTHER PUBLICATIONS

Machine language translation of DE102010053505.*

(Continued)

*Primary Examiner* — Mark A Manley
(74) *Attorney, Agent, or Firm* — Clements Bernard Walker; Christopher L. Bernard

(57) ABSTRACT

An actuating means for a park lock arrangement, where the actuating means is arranged to switch between a release position and a lock position, where the actuating means includes a lock section provided with a lock section bearing surface adapted to bear against an actuation end of a park pawl in the lock position, where the lock section bearing surface is flat. The advantage of the invention is that a compact and cost-effective actuating means for a park lock arrangement with is provided.

20 Claims, 5 Drawing Sheets

(56) References Cited

U.S. PATENT DOCUMENTS

2014/0083238 A1* 3/2014 Rhoades .................. B60T 7/02
                                                              74/519
2015/0025750 A1   1/2015 Weslati et al.
2016/0025214 A1   1/2016 Yoshida

FOREIGN PATENT DOCUMENTS

| DE | 19643812 A1    |   | 5/1998  |
|----|----------------|---|---------|
| DE | 102010029401 A1 |  | 12/2011 |
| DE | 102010053505   | * | 6/2012  |
| DE | 102013213707 A1 |  | 1/2015  |
| DE | 102015210287 A1 |  | 12/2016 |
| EP | 2551558 A1     |   | 1/2013  |
| GB | 2467378 A      |   | 8/2010  |
| GB | 2485907 A      |   | 5/2012  |
| WO | 2013024217 A1  |   | 2/2013  |
| WO | 2013053577 A1  |   | 4/2013  |

OTHER PUBLICATIONS

Oct. 22, 2018 European Search Report issue on International Application No. EP18172506.
Office action and search report issued in the corresponding CN application No. 201910378921.4.

* cited by examiner

ACTUATING MEANS FOR A PARK LOCK ARRANGEMENT, PARK LOCK ARRANGEMENT AND VEHICLE COMPRISING SUCH A PARK LOCK ARRANGEMENT

CROSS-REFERENCE TO RELATED APPLICATION

The present disclosure claims the benefit of priority of co-pending European Patent Application No. 18172506.0, filed on May 15, 2018, and entitled "ACTUATING MEANS FOR A PARK LOCK ARRANGEMENT, PARK LOCK ARRANGEMENT AND VEHICLE COMPRISING SUCH A PARK LOCK ARRANGEMENT," the contents of which are incorporated in full by reference herein for all purposes.

TECHNICAL FIELD

The present invention relates to an actuating means for a park lock arrangement for a vehicle, a park lock arrangement and a vehicle including such a park lock arrangement. The actuating means is non-symmetric and is adapted to cooperate with a support roller.

BACKGROUND

Vehicles having an automatic transmission, or electric vehicles that do not have a gearbox, are provided with a park lock function adapted to lock the output shaft of the automatic transmission or the output shaft of the electric motor, which restricts the vehicle from moving in any direction. A parking pawl prevents the transmission from rotating, and therefore the vehicle from moving. The parking pawl locks the transmission's output shaft to the transmission casing or the output shaft of the electric motor by engaging a pawl (a pin) that engages with a parking gear (a notched wheel) arranged on the output shaft, stopping it (and thus the driven wheels) from rotating. The parking pawl will lock the shaft when it extends down between two teeth of the parking gear. The parking gear may also be mounted in other positions, as long as it will be able to prevent the wheels of the vehicle to rotate.

The parking pawl is prevented from being engaged during driving or when the vehicle is moving. On a vehicle having an automatic transmission, this is done by blocking the gear selector until a safe engagement speed for the vehicle is reached. Software may also be used to control that this condition is avoided and that the pawl can only be engaged when the vehicle has come to a standstill.

The actuating means for the parking pawl is normally provided with a spring that will push the parking pawl towards the parking gear. If the vehicle stands still and the parking pawl bears on the top surface of a tooth, the parking pawl will be pushed against the top surface of the tooth. Should the vehicle move slightly, the parking pawl will be pushed down between the teeth by the spring and will lock the output shaft. With this solution, it is not important that the parking pawl extends down between the teeth directly when it is engaged.

A park lock arrangement will normally include a longitudinally extended parking pawl which pivots around a pivot pin. The locking tooth of the parking pawl is arranged at one end of the parking pawl, at the opposite side from the pivot axis. An actuator device will pivot the parking pawl towards the parking gear. The actuator device normally includes a conical bushing that will pivot the parking pawl towards the parking wheel.

US 2015 025750 A, US 2016 025214 A and US 2010 193319 A all disclose such park lock arrangements. Such park lock arrangements normally functions relatively well, but are relatively large and heavy. There is thus room for improvements.

SUMMARY

An object of the invention is therefore to provide an improved actuating means for a park lock arrangement for a vehicle. A further object of the invention is to provide a park lock arrangement including such an actuating means. A further object of the invention is to provide a vehicle including such a park lock arrangement.

In an actuating means for a park lock arrangement, where the actuating means is arranged to switch between a release position and a lock position, where the actuating means includes a lock section provided with a lock section bearing surface adapted to bear against an actuation end of a park pawl in the lock position, and a release section provided with a release section bearing surface adapted to bear against the actuation end of the park pawl in the release position, and where the actuating means includes an upper bearing surface, the object of the invention is achieved in that lock section bearing surface is flat.

By this first embodiment of an actuating means according to the invention, a compact and light-weight actuating means is provided, where the actuating means can slide from a release position to a lock position in a straight longitudinal direction. By providing the actuating means with a flat upper bearing surface, the bearing surface of the actuating means is enlarged compared with circular actuating means. This will improve the force handling capacity of the actuating means. The upper bearing surface of the actuating means is adapted to slide against a bearing surface of a park lock arrangement, which may be fixed or rotatable. The lock section bearing surface of the actuating means is also flat, which will enlarge the contact surface between the actuating means and the park pawl, which will also improve the force handling capacity of a park lock arrangement.

The actuating means is non-circular and is provided with a rectangular cross-section, where the side walls of the actuating means are parallel. The flat bearing surfaces will hold the actuating means in the proper alignment. The return spring of the park pawl will always provide a force pushing the actuating means towards a bearing surface of the park lock arrangement. In this way, the actuating means will not rotate. It is possible to provide sideways bearing surfaces adapted to bear against the side walls of the actuating means in order to improve the guiding of the actuating means further.

The actuating means is adapted to interact with a bearing surface of a park lock arrangement. In one development, the bearing surface of the park lock arrangement is a flat bearing surface arranged on e.g. the transmission housing. The bearing surface may also be somewhat convex, where the contact surface between the bearing surface and the actuating means is flat in a direction perpendicular to the moving direction of the actuating means. The bearing surface is in this example preferably made from the same material as the actuating means.

In one development, the park lock arrangement includes a support roller, adapted to support the actuating means. The support roller will bear against the upper bearing surface of the actuating means, and will provide a support when pushing the park pawl to the lock position. The support roller will also bear against the actuating means when the park pawl is in the release position, where the actuating means is pushed towards the support roller by the return spring of the park lock arrangement. The support roller must be able to withstand the radial force acting on the support roller from the park pawl and the parking gear when the vehicle is parked in a slope. Since the system is adapted to be self-opening, i.e. the park pawl will exit the parking gear when the actuating means is removed from the park pawl, there is a radial force acting on the support roller. Also in this example, the contact surface between the support roller and the actuating means is flat in a direction perpendicular to the moving direction of the actuating means.

The actuating means is suitable to be used with different park pawl, both traditional park pawls that are provided with an arm that pivots around a pivot axis, and a park pawl that slides in a straight direction between a lock position and a release position.

BRIEF DESCRIPTION OF THE DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 1:
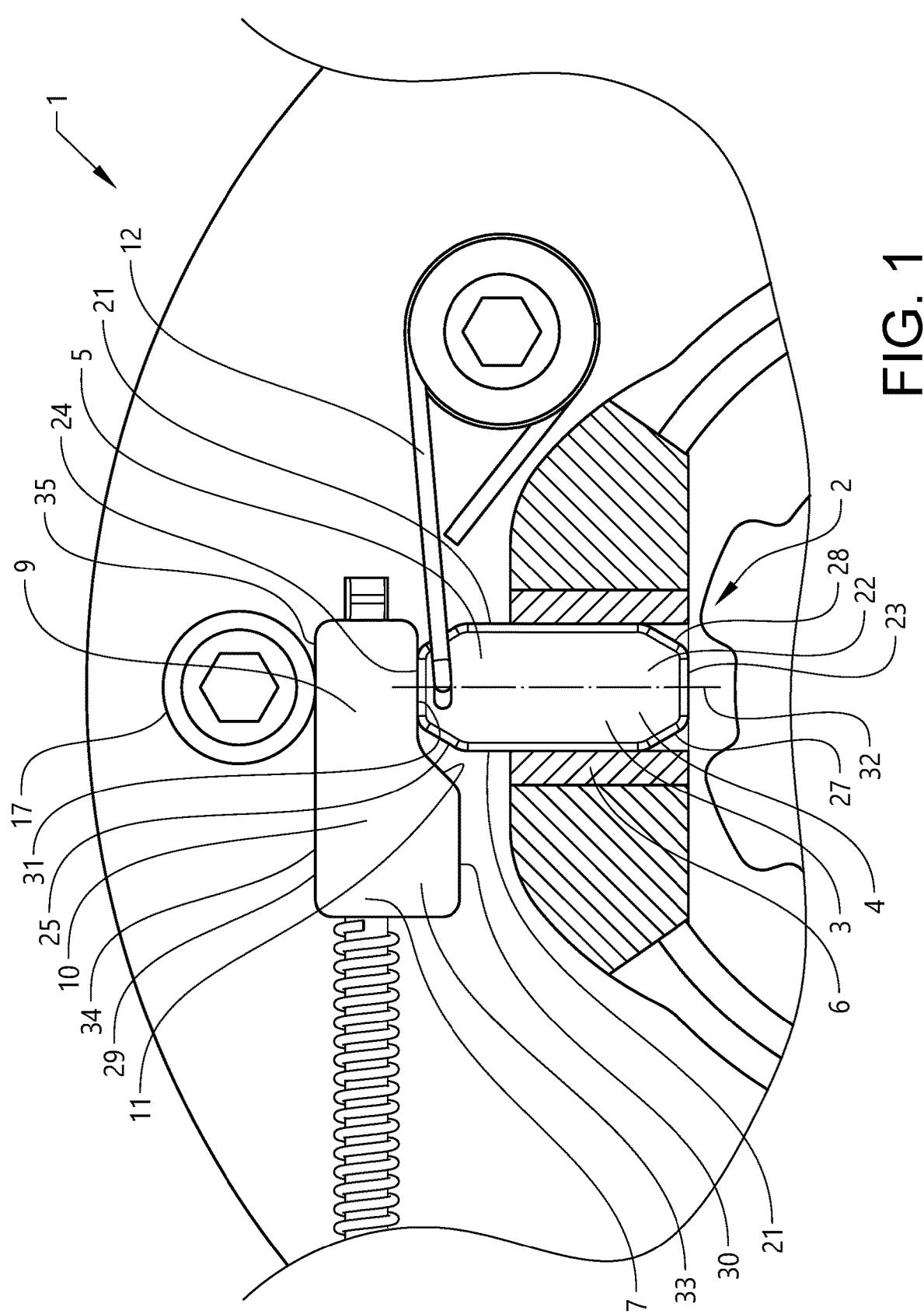
FIG. 1 shows a first example of a park lock arrangement including an actuating means according to the invention in a release position.
Figure 2:
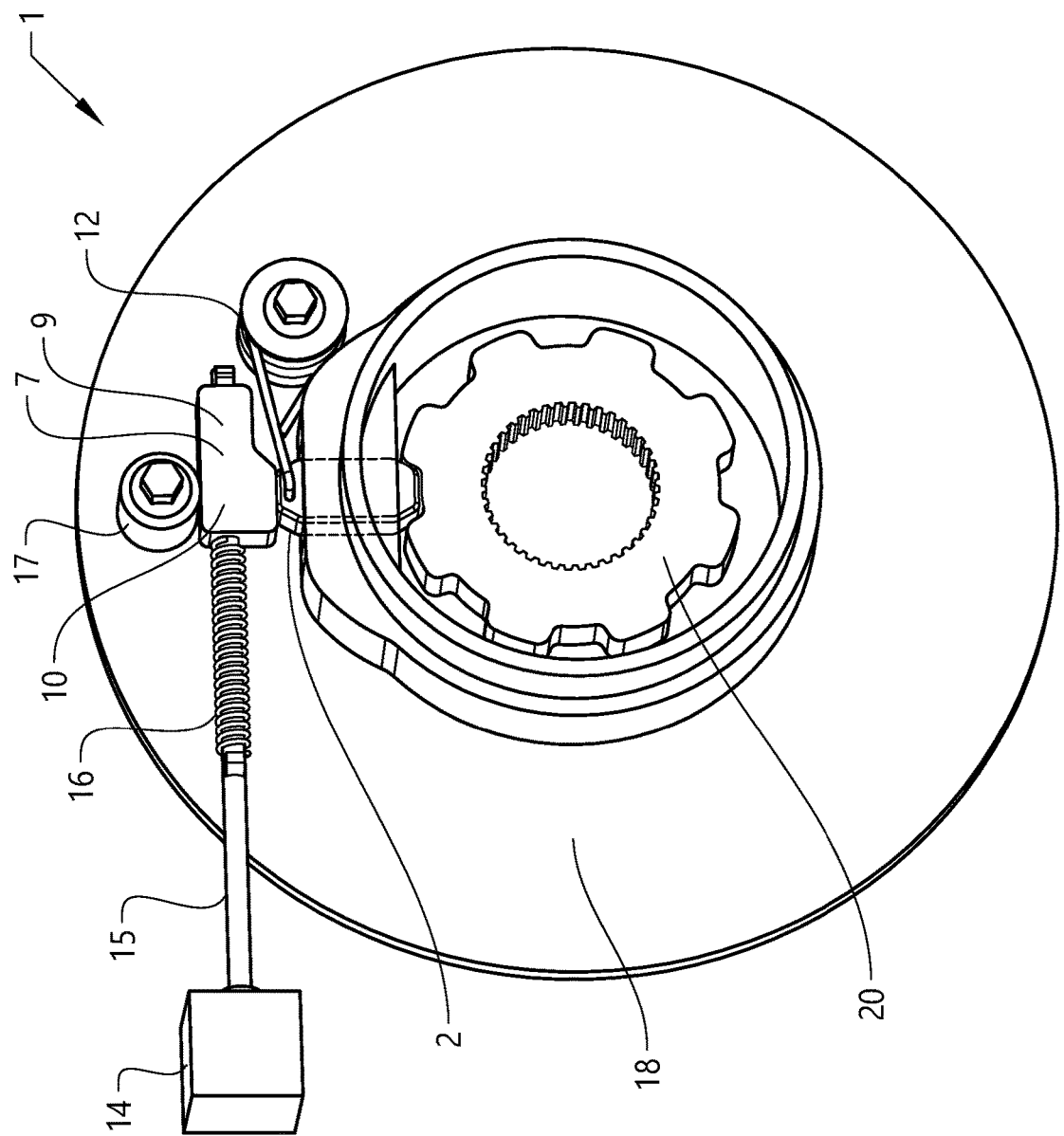
FIG. 2 shows the first example of a park lock arrangement including an actuating means according to the invention in a lock position.
Figure 3:
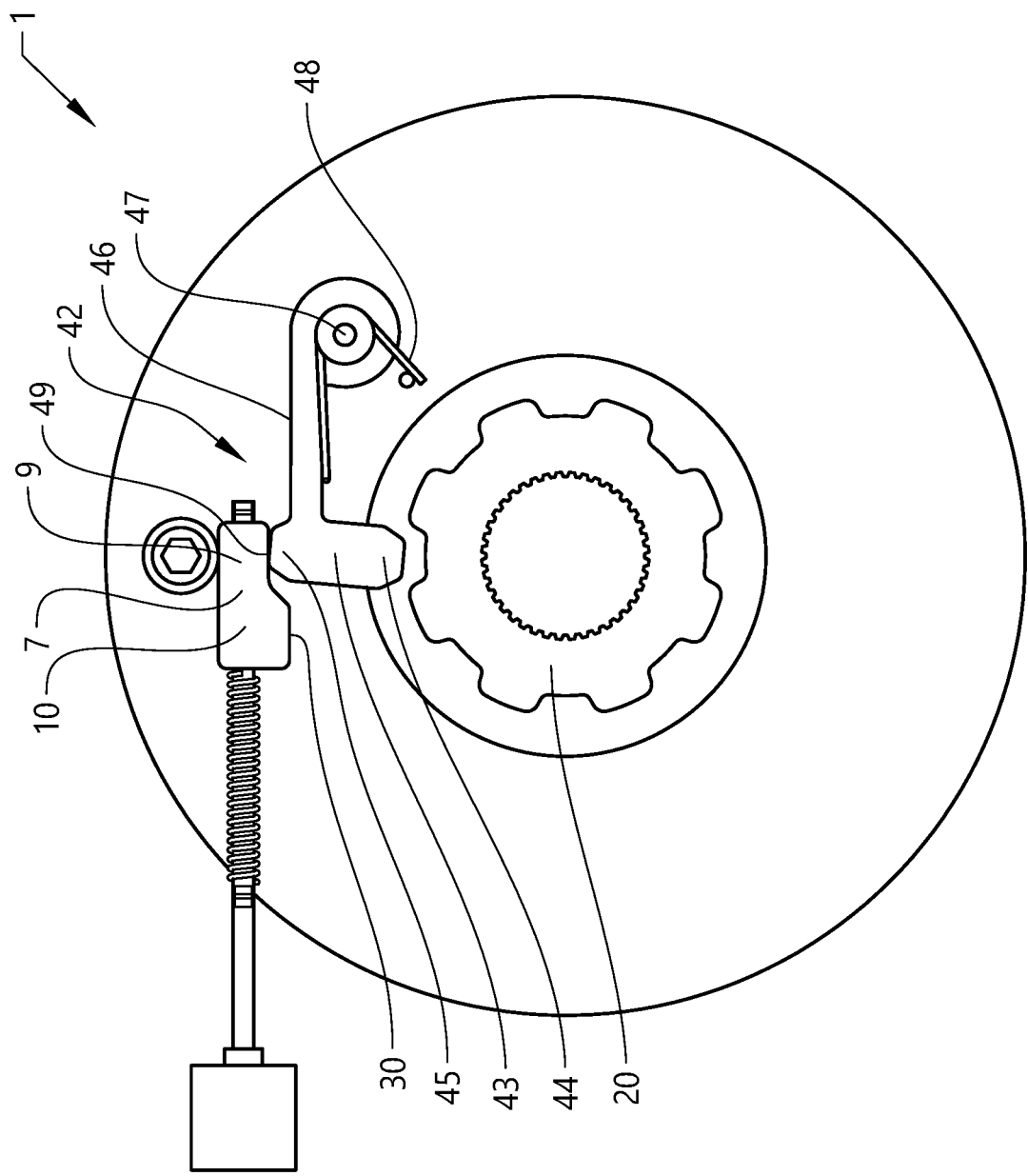
FIG. 3 shows a second example of a park lock arrangement including an actuating means according to the invention in a release position shows.
Figure 4:
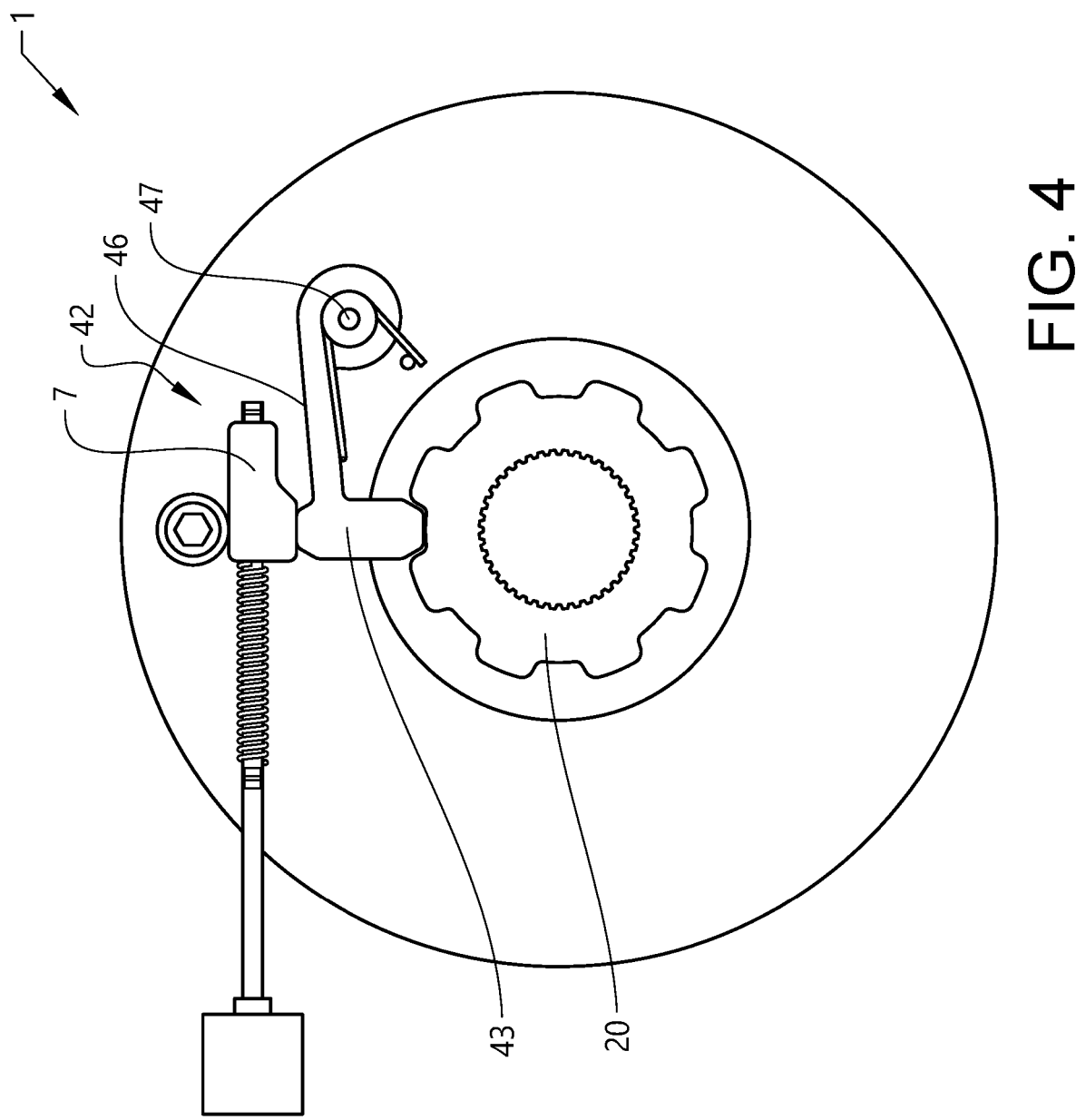
FIG. 4 shows the second example of a park lock arrangement including an actuating means according to the invention in a lock position.
Figure 5:
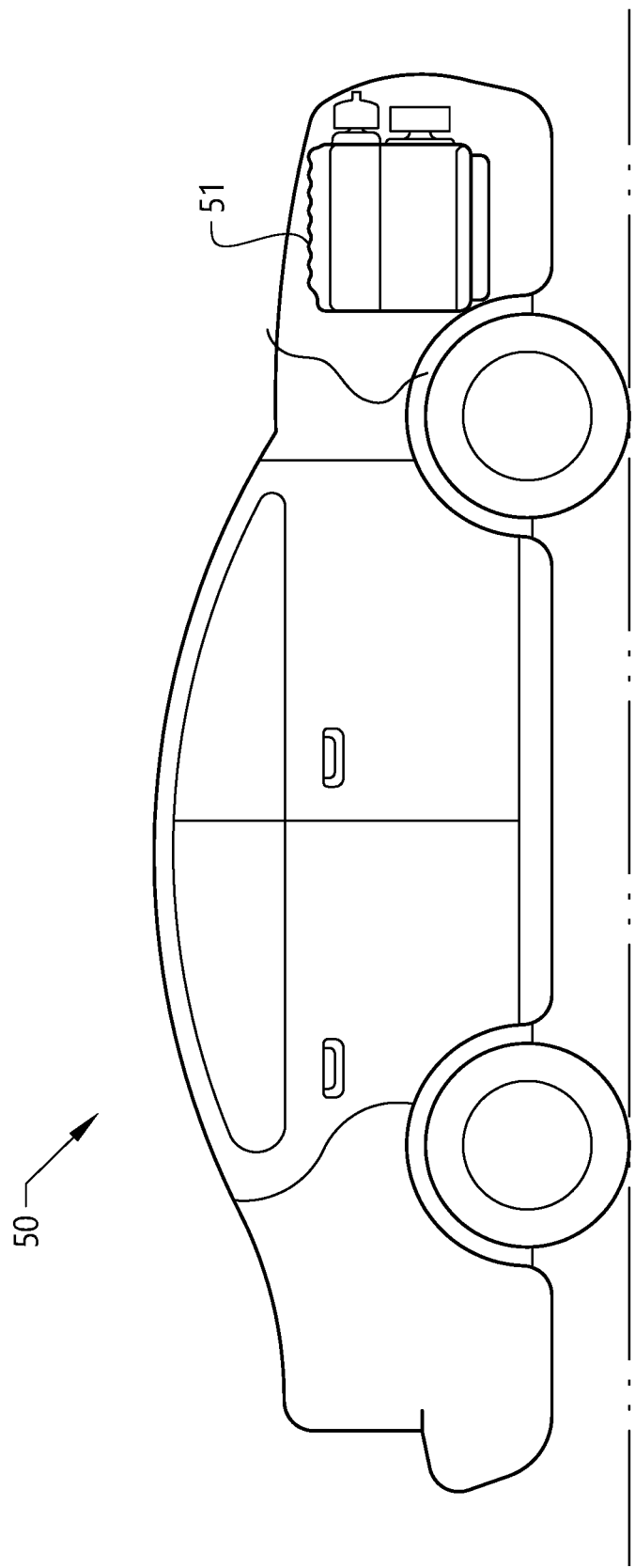
FIG. 5 shows a vehicle including an actuating means according to the invention.

FIGS. 1 and 2 shows a first example of a park lock arrangement including an inventive actuating means, FIGS. 3 and 4 shows a second example of a park lock arrangement including an inventive actuating means, and FIG. 5 shows a vehicle including an actuating means.

The first example of a park lock arrangement includes a park pawl 2, an actuating means 7, and a return spring 12. The park pawl is arranged to be in either a release position, as is shown in FIG. 1, in which the parking gear is free to rotate or in a lock position, as is shown in FIG. 2, in which the parking gear is locked. The park pawl 2 is adapted to slide between the release position and the lock position. In the shown example, the park pawl is longitudinal with a rectangular cross-section. The edges of the park pawl may be rounded or inclined. The park pawl includes a body 3 having a lock end 4 and an actuation end 5. The short sides 21 of the body are adapted to interact with the bushing, transferring the force acting on the park pawl to the transmission housing. The long sides 22 of the park pawl body are adapted to be arranged in parallel with the parking gear. The long sides 22 of the park pawl may also be slightly convex.

The actuating means 7 is arranged to interact with the park pawl 2. The actuating means 7 is adapted to move between a release position, in which it allows the park pawl 2 to be in a release position, to a lock position, in which it forces the park pawl to the lock position. The actuating means 7 is arranged on an actuator rod 15 which runs through a longitudinal hole through the actuating means. The actuating means is able to slide on the actuator rod and is pushed to the end of the actuator rod 15 by an actuator spring 16. The actuator rod is controlled by an actuator 14, which may be e.g. an electromagnetic solenoid or a rotating motor. The actuator is controlled by the control system of the vehicle, and is activated when the transmission shift selector is placed in the park position, or when an electric vehicle is parked.

The actuating means 7 is asymmetric and non-circular, and is in the shown example provided with a rectangular cross section, having parallel side walls 33. The use of a rectangular actuating means will allow for a more compact solution, and will further increase the bearing surface between the park pawl and the actuating means. With this solution, the lower bearing surfaces 30, 31 of the actuating means 7 can be flat, and the bearing surface 24 of the park pawl can also be flat. The thickness of the actuating means 7 may be the same as the thickness of the park pawl 2, i.e. correspond to the width of the short sides of the park pawl. The side walls of the actuating means 7 may be supported in a sideway direction by support surfaces or rollers, or the actuator rod may be supported in a sideway manner, such that the actuating means moves along a straight line.

The flat upper and lower bearing surfaces will hold the actuating means in the proper alignment. The return spring of the park pawl will always provide a force pushing the upper bearing surface of the actuating means towards a bearing surface of the park lock arrangement. In this way, the actuating means will not be able to rotate. It is possible to provide sideways bearing surfaces or rollers adapted to bear against the side walls of the actuating means in order to improve the guiding of the actuating means further.

The actuating means 7 includes a release section 9 and a lock section 10. The release section 9 includes an upper bearing surface 35 and a lower bearing surface 31, the lock section 10 includes an upper bearing surface 34 and a lower bearing surface 30. The actuating means 7 includes an upper bearing surface 29 which consists of the upper bearing surface 35 of the release section 9 and upper bearing surface 34 of the lock section 10. The upper bearing surface 29 is preferably flat. The lower bearing surface 30 of the lock section is also preferably flat, and the lower bearing surface 31 of the release section 9 may also be flat. Between the lower bearing surface 31 of the release section 9 and the lower bearing surface 30 of the lock section 10, there is arranged an inclined surface 11.

The actuating means 7 is adapted to interact with a bearing surface of a park lock arrangement. In one development, the bearing surface of the park lock arrangement is a flat bearing surface arranged on e.g. the transmission housing. The bearing surface of the park lock arrangement may also be somewhat convex, where the contact surface between the bearing surface of the park lock arrangement and the actuating means is flat in a direction perpendicular to the moving direction of the actuating means. The bearing surface is in this example preferably made from the same material as the actuating means.

The park lock arrangement 1 may also include a support roller 17, adapted to support the actuating means 7. The support roller will bear against the upper bearing surface 29 of the actuating means, and will provide a support when pushing the park pawl 2 to the lock position. The support roller 17 will also bear against the actuating means when the park pawl 2 is in the release position, where the actuating means 7 is pushed towards the support roller 17 by the return spring 12 of the park lock arrangement. The support roller must be able to withstand the radial force acting on the support roller from the park pawl and the parking gear when the vehicle is parked in a slope. Since the system is adapted to be self-opening, i.e. the park pawl will exit the parking gear when the actuating means is removed from the park pawl, there is a radial force acting on the support roller. The contact surface between the support roller and the actuating means is flat in a direction perpendicular to the moving direction of the actuating means.

The park lock arrangement 1 includes a support roller 17 arranged at the transmission housing 18. The support roller is adapted to support the park pawl 2 through the actuating means 7 and will take up the, in the shown example, vertical force acting on the park pawl when the park pawl is in the lock position. The support roller 17 will bear against the upper bearing surface 29 of the actuating means 7, and will provide a support when pushing the park pawl to the lock position. The support roller will also bear against the actuating means when the park pawl is in the release position, where the actuating means 7 is pushed towards the support roller 17 by the return spring 12 of the park lock arrangement. This is shown in FIG. 1. The upper bearing surface 29 is preferably parallel with the bearing surface 30 of the lock section 10, but a slight offset by a few degrees is possible. The upper bearing surface 29 may be parallel to the bearing surface 31 of the release section 9.

When the actuating means 7 is moved from the release position to the lock position, the inclined surface 11 will come in contact with the actuation bearing surface 25 of the actuation end 5 of the actuating means 7. If the park pawl is positioned such that it is directly between two teeth of the parking gear, the inclined surface 11 will push the park pawl down between the teeth of the parking gear and the actuating means 7 will move to the lock position, where the lock section bearing surface 30 of the lock section 10 bears against the actuation end bearing surface 24 of the actuation end 5 of the park pawl 2. This is shown in FIG. 2. The actuator spring 16 will push the actuating means from the release position to the lock position when the actuator is controlled to lock the park lock arrangement 1. The spring force of the actuator spring 16 will overcome the force of the return spring 12 and the friction of the park pawl.

When the actuating means 7 is moved from the release position to the lock position and the park pawl is positioned such that the lock end bearing surface 23 of the lock end 4 will bear on the top land of a tooth of the parking gear, the park pawl 2 cannot be pushed down between the teeth of the parking gear. The park pawl will be pushed down somewhat, and the inclined surface 11 of the actuating means 7 will bear on the inclined actuation bearing surface 25 of the actuation end 5 of the park pawl. The actuator spring 16 will be compressed, and the actuator rod 15 will partly slide through the opening in the actuating means. If the vehicle moves slightly, the parking gear will rotate some degrees such that the park pawl will be pushed down between the teeth of the parking gear by the actuating means 7. The inclined surface 11 will push the park pawl down and the lock section bearing surface 30 of the lock section 10 will bear on the park pawl.

The actuating means 7 will at the same time move to the lock position by the actuator spring 16.

The lock end 4 of the park pawl is adapted to interact with the teeth of the parking gear 20, and is provided with inclined bearing surfaces on the short sides of the lock end, a first lock bearing surface 27 and a second lock bearing surface 28. The first lock bearing surface 27 is adapted to block the parking gear from rotation in one direction, and the second lock bearing surface 28 is adapted to block the parking gear from rotation in the other direction. The inclination will allow the park pawl to easier enter between two teeth of the parking gear. In the shown example, the angle of a lock bearing surface is 30 degrees with respect to the centre axis 32 of the park pawl 2, but other inclination angles are also possible. A lock bearing surface must provide a secure locking of the parking gear. The inclination angle is preferably relatively acute, such that the park pawl will be able to hold the parking gear without deformation. The lock end 4 is also provided with a lock end bearing surface 23, which is adapted to bear against the top land of a tooth of the parking gear. The inclination of the lock bearing surfaces of the park pawl is also important in order to provide a park pawl that is self-opening, i.e. the park pawl will exit the parking gear when the holding support for the park pawl in the lock position is removed from the park pawl. The angle between the lock end 4 of the park pawl and the teeth of the parking gear must thus allow the park pawl to be pushed away from the parking gear.

The actuation end 5 is adapted to interact with the actuating means 7. The actuation end 5 of the park pawl 2 is provided with an inclined actuation bearing surfaces 25. The inclination will allow the actuating means 7 to easier slide against the actuation end 5 between the release position and the lock position. The actuation end 5 is also provided with an actuation end bearing surface 24, which is adapted to bear against the actuating means 7.

The bearing surface 30 of the lock section 10 is preferably substantially perpendicular to the centre axis 32 of the park pawl. The force acting on the park pawl 2 when the vehicle is parked is transferred from the bearing surface 24 of the actuation end 5 to the bearing surface 30 of the lock section 10 of the actuating means 7. These surfaces must thus correspond to each other and should be parallel to each other. The bearing surface 31 of the release section 9 must only take up the force from the return spring when the park pawl is in the release position, and is not critical. In the shown example, the bearing surface 31 is also parallel to the bearing surface 24 of the actuation end of the park pawl 2.

The park pawl 2 is preferably made from a metal, and may e.g. be made of forged steel or sintered steel. It is important that the park pawl can withstand the forces from the parking gear when the vehicle is parked in a slope. The parking gear 20 is also made of steel. In the shown example, the park pawl 2 is suspended in a bushing 6 surrounding the park pawl. The use of a bushing will reduce the risk of galvanic corrosion between the transmission housing and the park pawl, especially when they are made from different materials. The bushing must also be able to withstand the force acting on the bushing from the park pawl and the parking gear. This force may be substantial, e.g. when the vehicle is parked in a downhill or uphill slope. The inner walls of the bushing are preferably straight and parallel.

A return spring 12 is arranged at the transmission housing 18. One end of the return spring bears on the transmission housing, and the other end is arranged in an opening in the actuating end 5 of the park pawl. The return spring is arranged to push the park pawl towards the release position, such that the park pawl will be pushed away from the parking gear regardless of the mounting position of the park pawl on the transmission housing. In the shown example, the park lock arrangement 1 is arranged at the top of the transmission housing, such that the park pawl is pushed upwards by the return spring. In the shown example, the return spring 12 is a wound coil spring. Other types of springs are also possible to use, depending e.g. on the available space.

In a second example, the park lock arrangement 1 includes a pivoting park pawl 42 of a conventional type. The park pawl 42 is provided with a body 43 and an arm 46 which is suspended at a pivot point and which can pivot around a pivot axis 47 from a release position to a lock position. The head of the park pawl may resemble the park pawl described above or may have another shape. The park pawl is pushed to the release position by a return spring 48.

In the second example, the function of the actuating means 7 is the same as described above. The upper bearing surface 49 of the park pawl 42 is preferably designed such that it is parallel to the bearing surface 30 of the lock section 10 of the actuating means 7 when the park pawl is in the locking position. Due to the pivoting effect, the angle of the upper bearing surface of the park pawl will change between the release position and the lock position. FIG. 3 shows the park pawl in the release position, and FIG. 4 shows the park pawl in the lock position.

FIG. 5 shows a vehicle 50 including an internal combustion engine 51 having an automatic transmission including a park lock arrangement 1 according to the invention. The vehicle may also include an electric motor including a park lock arrangement 1. The park lock arrangement is in the shown example arranged at the output shaft of the transmission or the electric motor, such that it can block the output shaft from rotation. The park lock arrangement may also be positioned in other positions of the drivetrain, as long as the park lock arrangement can prevent the output shaft to rotate.

The invention is not to be regarded as being limited to the embodiments described above, a number of additional variants and modifications being possible within the scope of the subsequent patent claims.

The invention claimed is:

1. An actuating means for a park lock arrangement, where the actuating means is arranged to switch between a release position and a lock position, wherein the actuating means comprises a lock section provided with a lock section bearing surface adapted to bear against an actuation end of a park pawl in the lock position, and a release section provided with a release section bearing surface adapted to bear against the actuation end of the park pawl in the release position, wherein the actuating means comprises an upper bearing surface adapted to be pushed towards a support roller in the lock position and in the release position by a return spring of the park lock arrangement, and wherein the upper bearing surface and the lock section bearing surface are substantially parallel.

2. The actuating means according to claim 1, wherein the actuating means is arranged to slide between the release position and the lock position in a straight movement.

3. The actuating means according to claim 1, wherein the upper bearing surface comprises an upper bearing surface of the release section and an upper bearing surface of the lock section.

4. The actuating means according to claim 1, wherein the upper bearing surface of the release section and the upper bearing surface of the lock section are arranged in the same plane.

5. The actuating means according to claim 1, wherein a cross section of a body of the actuating means is rectangular.

6. The actuating means according to claim 1, wherein side walls of the actuating means are parallel.

7. The actuating means according to claim 1, wherein the actuating means comprises an inclined surface between the bearing surface of the release section and the bearing surface of the lock section.

8. The actuating means according to claim 1, wherein the actuating means is slidably arranged on an actuator rod.

9. A park lock arrangement, comprising the actuating means according to claim 1 and a park pawl.

10. The park lock arrangement according to claim 9, wherein the park lock arrangement comprises a support roller arranged to bear against the upper bearing surface of the actuating means.

11. The park lock arrangement according to claim 9, wherein the park lock arrangement comprises a park pawl that is arranged to slide in a straight movement from a release position to a lock position.

12. The park lock arrangement according to claim 9, wherein the park lock arrangement comprises a park pawl that is arranged to pivot around a pivot axis from a release position to a lock position.

13. A vehicle, comprising the park lock arrangement according to claim 9.

14. A park lock arrangement, comprising:
a park pawl; and
an actuating means arranged to switch between a release position and a lock position, wherein the actuating means comprises a lock section provided with a lock section bearing surface adapted to bear against an actuation end of a park pawl in the lock position, and a release section provided with a release section bearing surface adapted to bear against the actuation end of the park pawl in the release position, wherein the actuating means comprises an upper bearing surface adapted to be pushed towards a support roller in the lock position and in the release position by a return spring of the park lock arrangement, and wherein the upper bearing surface and the lock section bearing surface are substantially parallel.

15. The park lock arrangement according to claim 14, wherein the actuating means is arranged to slide between the release position and the lock position in a straight movement.

16. The park lock arrangement according to claim 14, wherein the upper bearing surface comprises an upper bearing surface of the release section and an upper bearing surface of the lock section.

17. The park lock arrangement according to claim 14, wherein the upper bearing surface of the release section and the upper bearing surface of the lock section are arranged in the same plane.

18. The park lock arrangement according to claim 14, wherein a cross section of a body of the actuating means is rectangular and wherein side walls of the actuating means are parallel.

19. The park lock arrangement according to claim 14, wherein the actuating means comprises an inclined surface between the bearing surface of the release section and the bearing surface of the lock section.

20. The park lock arrangement according to claim 14, wherein the actuating means is slidably arranged on an actuator rod.

* * * * *